US006827322B2

(12) United States Patent
Martinez et al.

(10) Patent No.: US 6,827,322 B2
(45) Date of Patent: Dec. 7, 2004

(54) RECOVERABLE IMPROVED CASING FOR THE MANUFACTURE OF RECESSES

(76) Inventors: Serafin Garrido Martinez, Puerta Canseco n° 35-2° A, 38003 Santa Cruz de Tenerife (ES); Juan Ramón Rivero Alvarez, Puerta Canseco n° 35-2° A, 38003 Santa Cruz de Tenerife (ES)

( * ) Notice: Subject to any disclaimer, the term of this patent is extended or adjusted under 35 U.S.C. 154(b) by 129 days.

(21) Appl. No.: 10/268,027

(22) Filed: Oct. 9, 2002

(65) Prior Publication Data

US 2004/0061040 A1 Apr. 1, 2004

(30) Foreign Application Priority Data

Sep. 26, 2002 (ES) .......................................... 200202185

(51) Int. Cl.$^{7}$ .................................................. B29C 7/00

(52) U.S. Cl. ......................... 249/63; 249/178; 249/205; 425/468

(58) Field of Search .......................... 249/63, 175, 178, 249/205; 425/468

(56) References Cited

U.S. PATENT DOCUMENTS

| | | | | |
|---|---|---|---|---|
| 1,425,823 A | * | 8/1922 | Baker | 249/175 |
| 3,195,851 A | * | 7/1965 | Hofmann | 249/10 |
| 3,632,078 A | * | 1/1972 | Dashew | 249/183 |
| 4,034,956 A | * | 7/1977 | Gates | 249/180 |

* cited by examiner

*Primary Examiner*—James P. Mackey
*Assistant Examiner*—Donald Heckenberg
(74) *Attorney, Agent, or Firm*—Collard & Roe, P.C.

(57) ABSTRACT

A recoverable improved casing for the manufacture of recesses for buried bodies includes a mold with a section decreasing toward a smaller section end. The mould has internal longitudinal and transverse reinforcing ribs, which define nodes at their point of intersection. Some of these nodes have metallic flanges in a socket that are joined by tappets to a series of rods. The rods in turn are joined by tappets to a series of metallic interconnected crossbars. The ends of the crossbars protrude outside the mold, are joined by billets, and have a detachable coupling with the end of the rod of a hydraulic mold extractor piston.

1 Claim, 3 Drawing Sheets

RECOVERABLE IMPROVED CASING FOR THE MANUFACTURE OF RECESSES

CROSS REFERENCE TO RELATED APPLICATIONS

Applicants claim priority under 35 U.S.C. §119 of Spanish Application No. 200202185, filed Sep. 26, 2002.

OBJECT OF THE INVENTION

The present utility model relates to a recoverable improved casing for the manufacture of recesses.

BACKGROUND OF THE INVENTION

In recesses constructed using traditional methods, it is necessary assemble containing walls of earth that protect the places where the recess blocks are to be placed.

In addition, traditional manufacture using bricks requires a great deal of manpower, with the additional drawback that the construction materials occupy a great deal of space, which makes the work of the operators more difficult.

Another additional problem with the traditional construction is that, when the decomposition of the buried body occurs, filtrations to the outside of liquids generated by this process may occur, which constitutes a problem of aesthetics.

Therefore, the manufacture of recesses in reinforced concrete seems to be the most appropriate solution, given that it solves the problems described above, but despite this, it causes another fundamental problem, namely, if the casing cannot be recovered, it suffers from the same drawbacks as the traditional manufacturing process, while the recoverable casing has the problem that it deteriorates due to the forces exerted when being extracted.

DESCRIPTION OF THE INVENTION

The recoverable casing of the invention, for its constitution and use, provides all the advantages of manufacture of recesses in reinforced concrete and, in addition, has means by which finished piece can be detached before being removed, thus reducing the subsequent forces necessary to remove the casing, protecting and lengthening the life of the recoverable casing.

In accordance with the invention, the casing consists of a single-piece mould that comprises a laminar portion that forms a prismatic body of inverted "U" section, the smaller end of which appears closed. This mould is made preferably from fibreglass with internal reinforcement with a section of aluminium grid, the mould having longitudinal and transversal reinforcement ribs on its internal face.

The reinforcement section of aluminium grid is joined at the front part of the mould to a perimeter rib of appropriate thickness, and at the side edges to a side socket of low height, constituted preferably of metallic billets, which facilitates the movement of the mould during its removal.

In its inner part, the mould has a structure consisting of transversal rods at several heights, which are joined by means of tappets to flanges arranged on its internal walls, preferably at the nodes that form at the intersections of the interior reinforcement ribs and in the side socket, joining the rods by their opposite ends to the metallic crossbars linked to one another by a metallic section in zigzag form, these crossbars reaching protruding outside the mould, where they are joined by billets, preferably curved, to another billet equipped with an lug where it is coupled by means of a bolt to other protruding parallel lugs at the end of the rod of a hydraulic piston mounted in the central part of a structure in the form a "C", the branches of which rest horizontally on the sides of the front of the recess, through the outside of the frontal perimeter rib of the mould.

The mould is positioned over a continuous slab of reinforced concrete or over an adjacent lower recess. The concrete is then poured into the mould.

Once the concrete has set, it is stressed by means of the piston to extract the casing, these stresses being transmitted by means of the crossbars, rods, tappets and flanges to the walls of the mould in a slightly perpendicular direction, which causes its detachment with respect to the piece made from concrete and a first extracting movement thereof.

This separation leaves the mould free, such that it can then easily be extracted by pulling outwards at the perimeter protrusion.

BRIEF DESCRIPTION OF AN EXAMPLE OF AN EMBODIMENT OF THE INVENTION

Figure 1:
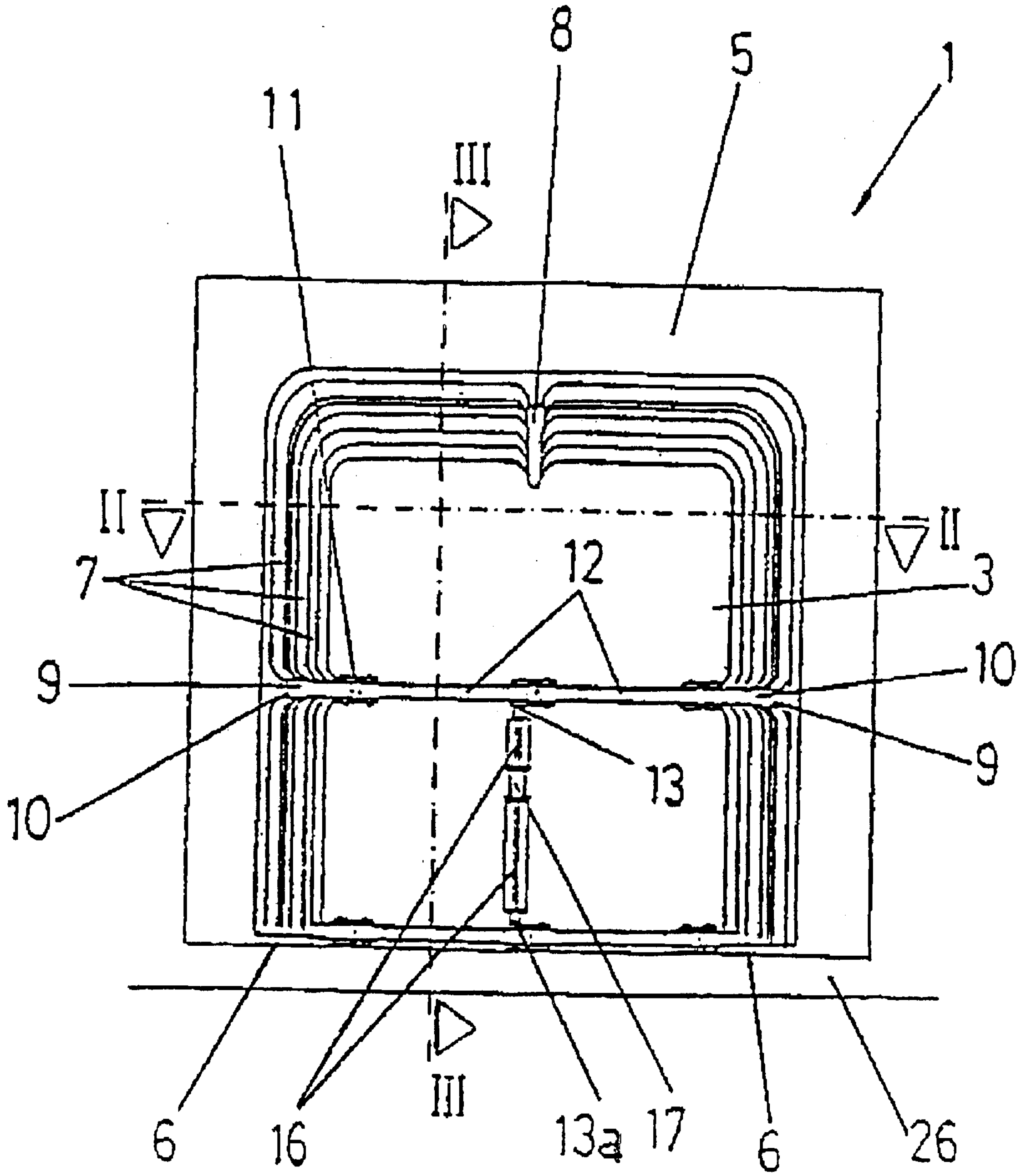
FIG. 1 shows an elevation of the mould that defines the casing of the invention.
Figure 2:
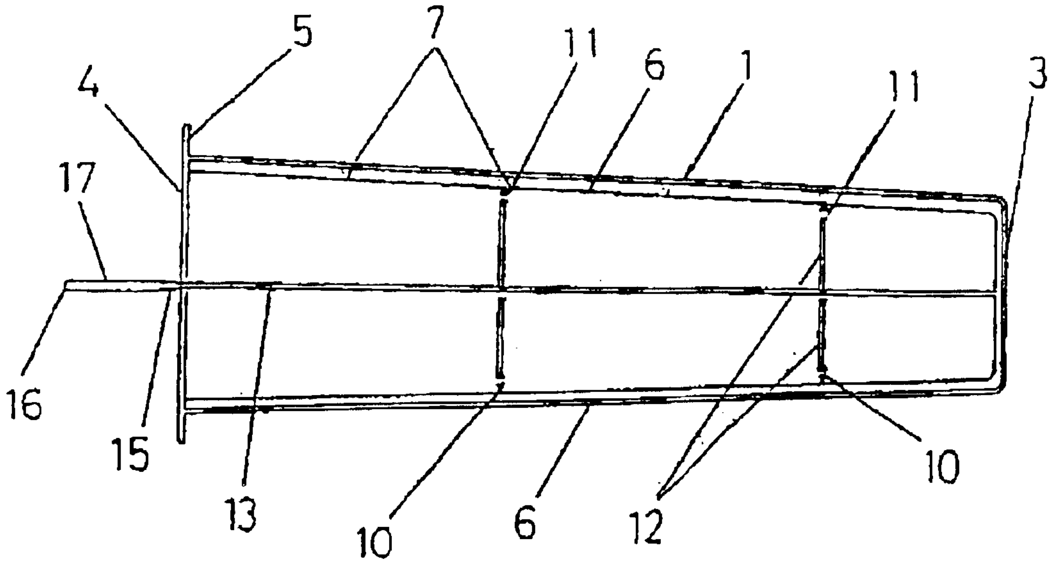
FIG. 2 shows a sectioned plan of the mould that defines the casing of the invention along lines II—II of FIG. 1.
Figure 3:
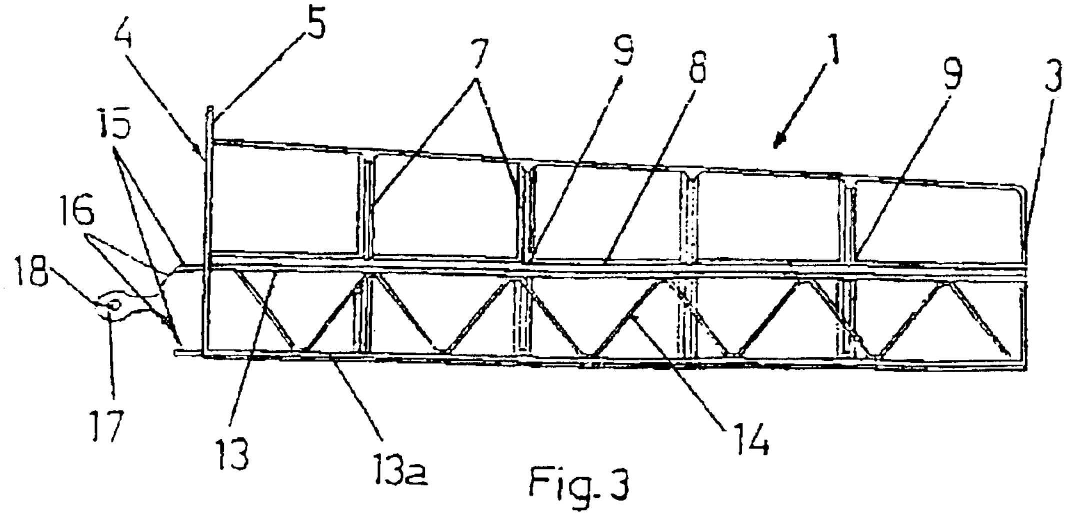
FIG. 3 shows a sectioned side view of the mould that defines the casing of the invention along lines III—III of FIG. 1.
Figure 4:
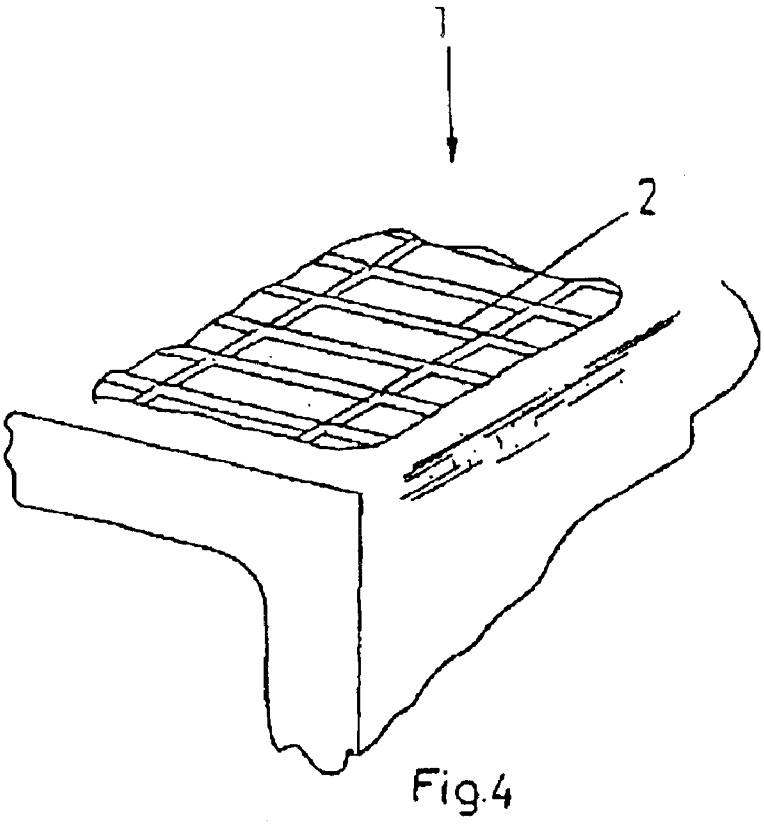
FIG. 4 shows details of the grid section of the reinforcement of the mould that defines the planking moulding of the invention.
Figure 5:
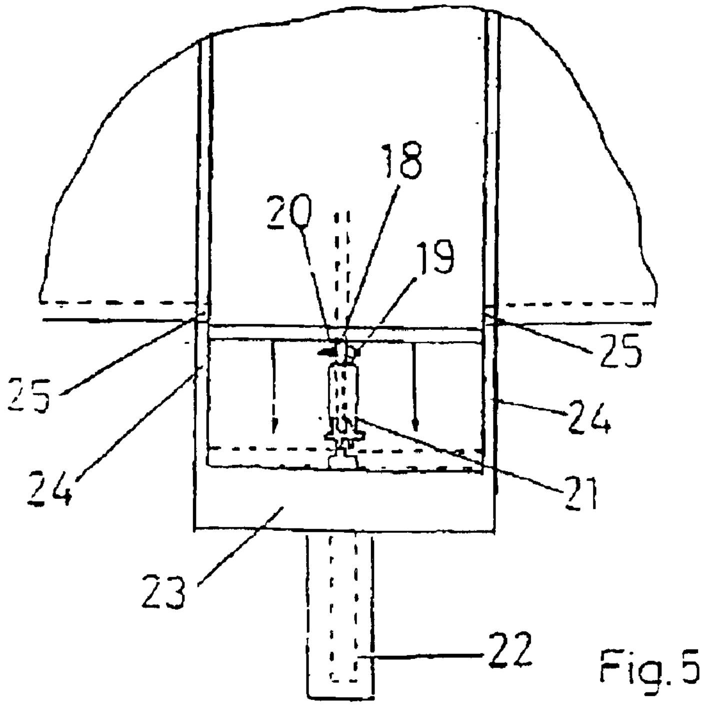
FIG. 5 shows an upper view of the mould utensil for removal of the casing of the invention during removal.

The planking moulding of the invention comprises a mould 1, of fibreglass with internal aluminium grid reinforcement 2, which has a prismatic shaped decreasing inverted "U" section, whose smaller section end 3 is closed and whose opposite end is open.

Through end 4, the grid reinforcement 2 is joined to a metallic rib 5, while, laterally, this reinforcement is joined to an end socket 6, also made of metal.

The inner part of the mould has some transversal reinforcement ribs 7 and other longitudinal ribs 8, with some of the nodes 9 formed by the intersection of the ribs, with some flanges 10 in the sockets for attachment, by means of some tappets 11, of overlaid metallic rods 12 that, at the opposite end, are joined by means of tappets to the metallic crossbars 13, 13*a*, joined to one another by means of a metallic portion 14 in the form of a zigzag, the ends 15 of which extend outside the mould, being joined by means of curved billets 16 to a billet 17 equipped with a lug 18 for coupling by means of a bar 19, with other lugs 20 at the ends of the rod 21 of a hydraulic piston 22, mounted centrally in a structure 23 in the form of a "C", whose ends 24 rest on the sides 25 of the front of the recess.

The mould is placed over a continuous slab 26 or over another analogous recess, subsequently filled with concrete, and once the concrete has set, the casing is removed by means of sudden pulls performed by the piston 22, which are transmitted by means of the crossbars 13, 13*a*, the rods 12 and the tappets 11 to the flanges 10, the direction being slightly perpendicular to the side walls of the mould, causing it to become detached from the piece of concrete, and a first movement, which facilitates the subsequent removal of the mould by pulling from the protrusion 5.

What is claimed is:

1. A recoverable improved casing for manufacturing of recesses comprising:

a prismatic mould of an inverted "U" section, the mould made from fiberglass;

the mould having an internal metallic grid support which is joined to an end rib having a greater cross-section than the metallic grid support, the internal grid support also having a lower end socket made of metal, the lower end socket being joined to said end rib;

wherein the mould has a decreasing section, with the smaller end being closed, the mould further having internal longitudinal and transversal reinforcement ribs, with nodes being defined at the points of intersection between longitudinal and transversal reinforcement ribs, some of the nodes having a socket of metallic flanges;

wherein the sockets of metallic flanges are joined by means of tappets to a series of rods, the rods in turn being joined by means of tappets to a series of metallic crossbars, with the metallic crossbars connected to one another;

wherein the crossbars having ends which extend outside the mould, the ends being joined by billets to a lug, with the lug by means of a rod being coupled to other parallel lugs, the parallel lugs being arranged at the end of a rod of a hydraulic mould removal piston, the piston being mounted in a structure in the form a "C", with the ends of the structure resting on the front of the recess.

* * * * *